(12) United States Patent
Nakamura et al.

(10) Patent No.: US 8,497,613 B2
(45) Date of Patent: Jul. 30, 2013

(54) PERMANENT MAGNET, MANUFACTURING METHOD THEREOF, AND ROTOR AND IPM MOTOR

(75) Inventors: Kenji Nakamura, Toyota (JP); Shigeto Takeuchi, Toyota (JP); Keiu Kanada, Miyoshi (JP); Masafumi Suzuki, Toyota (JP); Tomonari Kogure, Toyota (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 330 days.

(21) Appl. No.: 12/746,329

(22) PCT Filed: Dec. 2, 2008

(86) PCT No.: PCT/IB2008/003295
§ 371 (c)(1),
(2), (4) Date: Jun. 4, 2010

(87) PCT Pub. No.: WO2009/071975
PCT Pub. Date: Jun. 11, 2009

(65) Prior Publication Data
US 2010/0244608 A1 Sep. 30, 2010

(30) Foreign Application Priority Data
Dec. 6, 2007 (JP) .................................. 2007-316297

(51) Int. Cl.
*H01F 41/02* (2006.01)
*H02K 15/03* (2006.01)

(52) U.S. Cl.
USPC ............ 310/156.38; 29/607; 29/608; 29/596; 29/598; 310/156.43; 310/156.45; 310/156.53

(58) Field of Classification Search
USPC 310/156.38, 156.43, 156.45, 156.53; 29/607, 29/608, 596, 598
See application file for complete search history.

(56) References Cited

U.S. PATENT DOCUMENTS

| | | | |
|---|---|---|---|
| 3,126,617 A | 3/1964 | Blume | |
| 4,369,567 A | 1/1983 | Bosch et al. | |
| 5,122,319 A * | 6/1992 | Watanabe et al. | 264/109 |
| 6,254,694 B1 * | 7/2001 | Hasegawa et al. | 148/101 |
| 7,045,093 B2 * | 5/2006 | Tanaka et al. | 419/44 |
| 2004/0100156 A1 | 5/2004 | Joho | |
| 2006/0051233 A1 * | 3/2006 | Ugai et al. | 419/6 |
| 2006/0055266 A1 * | 3/2006 | Iwami et al. | 310/156.47 |

(Continued)

FOREIGN PATENT DOCUMENTS

| | | |
|---|---|---|
| DE | 975 672 C | 4/1962 |
| GB | 859862 A | 1/1961 |

(Continued)

OTHER PUBLICATIONS

Translation for foreign document JP 2003134750 A (year 2003).*

(Continued)

*Primary Examiner* — Tran Nguyen
*Assistant Examiner* — Alex W Mok
(74) *Attorney, Agent, or Firm* — Sughrue Mion, PLLC

(57) ABSTRACT

A manufacturing method for a permanent magnet includes the steps of a) producing a permanent magnet (1), b) fracturing the permanent magnet (1) to obtain two or more separate pieces (13), and c) restoring the permanent magnet (1) by fitting the fracture surfaces of adjacent separate pieces (13) together.

23 Claims, 8 Drawing Sheets

U.S. PATENT DOCUMENTS

| | | | |
|---|---|---|---|
| 2006/0186752 A1 * | 8/2006 | Matsumoto et al. | 310/156.53 |
| 2007/0017601 A1 * | 1/2007 | Miyata et al. | 148/105 |
| 2007/0209737 A1 * | 9/2007 | Satsu et al. | 148/105 |
| 2008/0036324 A1 * | 2/2008 | Kihara | 310/153 |
| 2008/0054738 A1 * | 3/2008 | Komuro et al. | 310/46 |

FOREIGN PATENT DOCUMENTS

| | | | |
|---|---|---|---|
| JP | 62-226533 A | | 10/1987 |
| JP | 63274123 A | * | 11/1988 |
| JP | 10-055929 A | | 2/1998 |
| JP | 10064745 A | * | 3/1998 |
| JP | 2001068317 A | * | 3/2001 |
| JP | 2001136692 A | * | 5/2001 |
| JP | 2001342502 A | * | 12/2001 |
| JP | 2003134750 A | * | 5/2003 |
| JP | 2003163129 A | * | 6/2003 |
| JP | 2004-096868 A | | 3/2004 |
| JP | 2005-198365 A | | 7/2005 |
| JP | 2006025552 A | * | 1/2006 |
| JP | 2006-238565 A | | 9/2006 |
| JP | 2007053351 A | * | 3/2007 |
| JP | 2007-166888 A | | 6/2007 |
| JP | 2008043124 A | * | 2/2008 |
| JP | 2008172977 A | * | 7/2008 |
| JP | 2008181923 A | * | 8/2008 |
| JP | 2010259231 A | * | 11/2010 |
| WO | WO 2010038748 A1 | * | 4/2010 |

OTHER PUBLICATIONS

Translation for foreign document JP 2001342502 A (year 2001).*

* cited by examiner

US 8,497,613 B2

PERMANENT MAGNET, MANUFACTURING METHOD THEREOF, AND ROTOR AND IPM MOTOR

BACKGROUND OF THE INVENTION

1. Field of the Invention

The invention relates to a method of manufacturing a permanent magnet that is inserted into a slot of a rotor for a permanent magnet embedded motor, a permanent magnet manufactured according to that method, a rotor provided with that permanent magnet, and an IPM motor provided with that rotor.

2. Description of the Related Art

Among the various types of known motors, including brushless DC motors, is a motor that has a permanent magnet embedded rotor in which a plurality of permanent magnets are embedded in a rotor core (this type of motor is known as an interior permanent magnet (IPM) motor and will hereinafter simply be referred to as an "IPM motor"). IPM motors are used as motors in hybrid vehicles, for example.

In a motor, a coil is formed by a winding being wound in either a concentrated or a distributed manner around stator teeth. Magnetic flux is then generated by applying current to the coil, and magnetic torque and reluctance torque are generated between that magnetic flux and the magnetic flux from a permanent magnet. A coil having a distributed winding coil has a larger number of magnetic poles than a concentrated winding coil does so the magnetic flux that enters the permanent magnet of the rotor from the teeth side (or the change in that magnetic flux) is relatively continuous when the rotor is rotating. Therefore, the change in the magnetic flux density when the rotor is rotating is relatively small. In contrast, with a concentrated winding coil, the change in the magnetic flux density is relatively large so an eddy current tends to be generated in the permanent magnet, causing the permanent magnet to generate heat. This may lead to irreversible thermal demagnetization which results in a decline in the magnetic property of the permanent magnet itself.

In terms of driving motors used in recent hybrid vehicles and electric vehicles, attempts are being made, for example, to increase the rotation speed or the pole number in order to meet the demand for better motor output performance. However, increasing the rotation speed or the like increases the variation in the magnetic field that acts on the magnet, and as a result, the eddy current tends to be generated. The thermal demagnetization of the magnet brought about by the generated heat conversely lowers motor performance and reduces motor durability.

Japanese Patent Application Publication No. 2005-198365 (JP-A-2005-198365), Japanese Patent Application Publication No. 2004-96868 (JP-A-2004-96868), and Japanese Patent Application Publication No. 2006-238565 (JP-A-2006-238565), for example, attempt to prevent the eddy-current from being generated, and thus prevent the thermal demagnetization that it causes, by forming the permanent magnet from a plurality of separate pieces which are then inserted together into rotor slots.

Making the permanent magnet from a plurality of separate pieces, as described in JP-A-2005-198365, JP-A-2004-96868, and JP-A-2006-238565, for example, is an effective way to suppress the generation of an eddy current which can be generated in the permanent magnet. The separate pieces that together form the permanent magnet described in JP-A-2005-198365, JP-A-2004-96868, and JP-A-2006-238565 are formed in one of two ways, i.e., i) each of the separate pieces is manufactured separately, or ii) a permanent magnet formed to the size and shape of the inside of the rotor slot into which the permanent magnet is to be inserted is machined (i.e., cut) into a plurality of separate pieces. The latter method of machining is typically used in view of manufacturing efficiency and manufacturing cost.

The machining described above requires an expensive cutting tool that has diamond chips adhered to the outer peripheral side of a cemented carbide disk, for example. Furthermore, this cutting tool will wear down and therefore must be replaced periodically, the frequency of which increases with the number of cuts (i.e., as the number of separate pieces into which the permanent magnet is to be cut increases). As a result of these and other factors, maintenance and rising manufacturing costs with this kind of machining are major concerns.

There are also other problems with cutting the permanent magnet by machining. For example, a ferrite magnet or a rare-earth magnet such as a neodymium magnet which is a permanent magnet has a metal structure formed of main phases S that contribute to magnetism and a grain boundary phase R that contributes to coercive force, as shown in FIG. 9 which is an enlarged view of the structure of the magnet. When the permanent magnet is divided by machining, separate pieces are formed along the cut line indicated by line L1 in the drawing. As is evident from the drawing, the line L1 is formed cutting, i.e., dividing, the main phases S so the main phases S that are cut are smaller than they are prior to being cut. As a result, the residual magnetic flux density (Br) ends up being lower after the cut.

Furthermore, the grain boundary phase R expresses the coercive force with respect to the main phases S that it surrounds. However, because the covering of the grain boundary phase R which surrounds the main phases S that contact the cut surface is broken thereby exposing the main phases S, magnetic reversal tends to easily occur in the external magnetic field. It is this magnetic reversal that leads to a decrease in the coercive force of the entire magnet.

SUMMARY OF THE INVENTION

This invention thus provides a method of manufacturing a permanent magnet which is extremely simple and inexpensive and does not reduce the size of the main phases nor break the covering of the surrounding grain boundary phase. The invention also provides a permanent magnet manufactured according to that method, a rotor provided with that permanent magnet, and an IPM motor provided with that rotor.

A first aspect of the invention relates to a manufacturing method of a permanent magnet that is to be inserted into a slot of a rotor for an IPM motor. This manufacturing method includes a first step of producing a permanent magnet of generally the same shape and size as the shape and size of the inside of the slot by pressure forming magnetic particles for a permanent magnet in a forming die, a second step of forming two or more separate pieces by fracturing the permanent magnet, and a third step of restoring the permanent magnet by fitting fracture surfaces of adjacent separate pieces together.

This manufacturing method of a permanent magnet may be a manufacturing method of a permanent magnet that is inserted into a rotor slot formed in a rotor of an IPM motor. More specifically, this manufacturing method may one which produces a permanent magnet that is divided into a plurality of pieces.

First, a forming die that includes a punch and a die and the like having a predetermined cavity is prepared, magnetic particles for a permanent magnet are injected into this forming die, and pressure forming is performed at a normal temperature atmosphere (step 1).

Next, the pressure formed body formed of a predetermined shape and size is sintered and the resultant sintered body is divided into a predetermined number of pieces. Here in this manufacturing method, a predetermined portion of the sintered body (permanent magnet) is pushed on such that the sintered body fractures instead of being machine cut by a cutting tool as in the related art (step 2).

As described above, when the permanent magnet that has a metal structure of main phases and a grain boundary phase fractures at the predetermined portion, it fractures along the grain boundary phase which is relatively weak (i.e., a so-called grain boundary fracture). Employing this fracture process makes it possible to keep the residual magnetic flux density from decreasing, keep the coercive force from decreasing due to magnetic reversal, as well as eliminate cutting tool replacement-related maintenance and reduce manufacturing costs.

After the permanent magnet that is to be fit into the rotor slot has been fractured into a predetermined number of pieces, it is then restored by fitting the fracture surfaces of the separate pieces together (step 3).

Also, in order to keep the fracture portion within an estimated area and perform the fracture more efficiently, a notch may be provided in a predetermined location on the surface of the formed permanent magnet.

Furthermore, when a notch is formed in the surface of the permanent magnet, the permanent magnet may be fractured after the notch has been pickled.

Also, in step 1 the permanent magnet may be formed by small pressure formed bodies which are pressure formed while stacked sequentially by performing pressure forming in a forming die sequentially in multiple stages. Moreover, at least the small pressure formed bodies that are adjacent to one another may be formed from magnetic particles of different material.

This manufacturing method forms a single permanent magnet by stacking a plurality of small pressure formed bodies while sequentially pressure forming them, and aims to facilitate fracturing at the boundary surfaces by having the magnetic particles of at least those small pressure formed bodies that are adjacent to one another different be of different material.

The small pressure formed bodies are formed by injecting magnetic powder of an amount corresponding to the number of press operations to be performed into a forming die and pressure forming it. The magnetic powder used to form a given small pressure formed body is of a different material than the magnetic power used to form the preceding small pressure formed body. Two small pressure formed bodies together form a press-formed body. This process is repeated for the number of press operations until a pressure formed body the size and shape of the permanent magnet is obtained. This is then extracted from the die and placed in a sintering furnace, after which it is then fractured.

When the permanent magnet is sintered, residual stress occurs at the boundary surface of the small pressure formed bodies, which axe of different material, due to the difference in the amounts that the small pressure formed bodies contract. As a result, the boundary surface is a weak spot during fracturing. Also, the boundary surface is a press surface so the adhesive force between boundary surfaces is weaker than the joining strength between the main phases and the grain boundary phases in the small pressure forming bodies. As a result, these boundary surfaces tend to fracture easily.

Also, in steps 2 and 3 described above, the separate pieces may adhere to each with resin or be molded to each other with resin by housing the permanent magnet in a container filled with resin and then fracturing the permanent magnet in that container. Alternatively, in steps 2 and 3, the separate pieces may adhere to each with resin or be molded to each other with resin by filling resin into the container at the same time that the permanent magnet is fractured in the container.

After the permanent magnet is actually fractured and then restored by fitting the separate pieces together, the separate pieces must be adhered or molded together before being magnetized so that the magnet arrangement is not disrupted by the magnetic force of the separate pieces. This, however, requires the time and trouble of adhering together each and every piece of the permanent magnet. Moreover, if a piece is lost, the permanent magnet is unable to be restored (i.e., formed) which reduces the fabrication yield.

Filling the inside of the container having a cavity the same size and shape as the rotor slot with a predetermined amount of resin and fracturing the permanent magnet in that container enables the resin to effectively penetrate between the pieces of permanent magnet at the same time the permanent magnet is fractured, for example.

Also, in step 2, the permanent magnet may be fractured at a fracture speed of 5 m/sec or less.

Moreover, in step 2 described above, when the permanent magnet is to be fractured into at least four separate pieces and at least three notches are formed in the permanent magnet, a fracturing device may be used which includes a plurality of sharp pointed members that fit into corresponding notches and pushing members that push the sharp pointed members other than the sharp pointed member in the center out toward the end portions of the permanent magnet, and the permanent magnet may be fractured while the pushing members push the corresponding sharp pointed members out when the sharp pointed members are pushed into the notches during fracturing.

As can be understood from the description above, the method of manufacturing a permanent magnet according to the invention is an extremely simple and inexpensive method that enables a permanent magnet with superb magnetic properties to be produced. Furthermore, an IPM motor with superb output performance is able to be obtained by using a permanent magnet manufactured according to this method.

BRIEF DESCRIPTION OF THE DRAWINGS

The foregoing and further objects, features and advantages of the invention will become apparent from the following description of embodiments with reference to the accompanying drawings, wherein like numerals are used to represent like elements and wherein.

DETAILED DESCRIPTION OF THE EMBODIMENTS

Figure 1A:
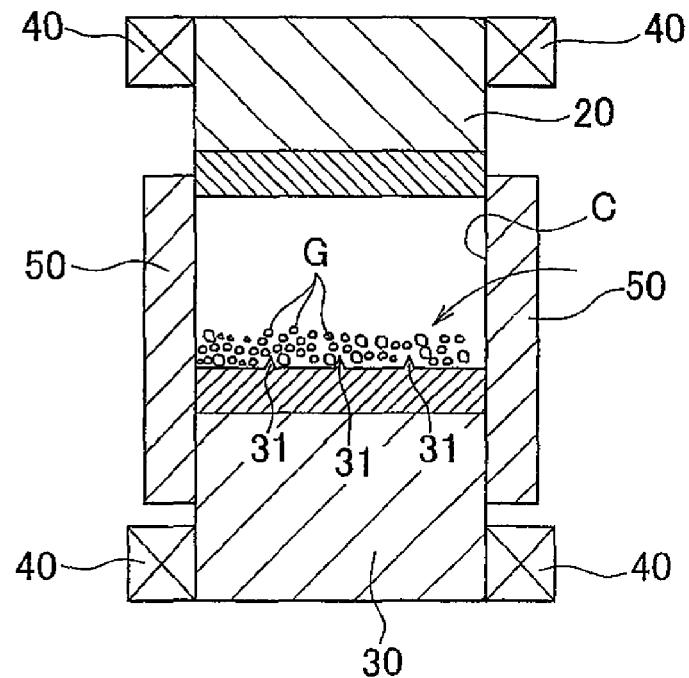
FIGS. 1A and 1B are diagrams illustrating a method of manufacturing a permanent magnet according to the invention, with FIG. 1A being a diagram showing magnetic particles being injected into a forming die, and FIG. 1B being a diagram showing longitudinal magnetic field press forming.
Figure 1B:
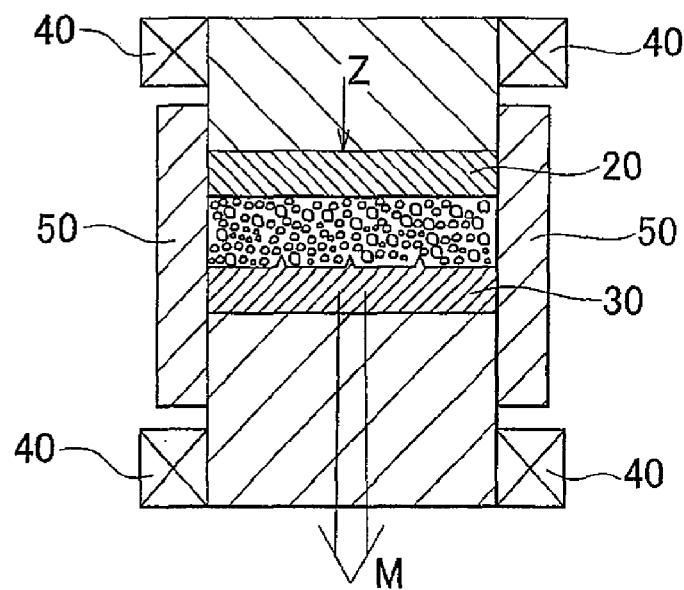
Figure 3:
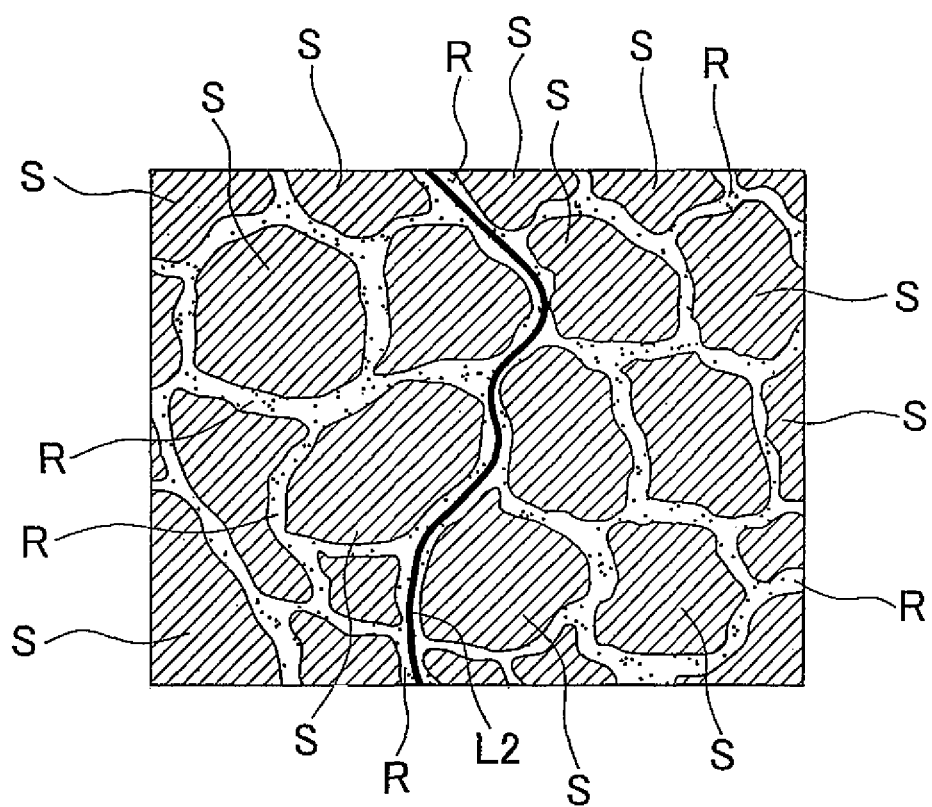
FIG. 3 is a view showing a fracture line in the structure of the permanent magnet.
Figure 4A:
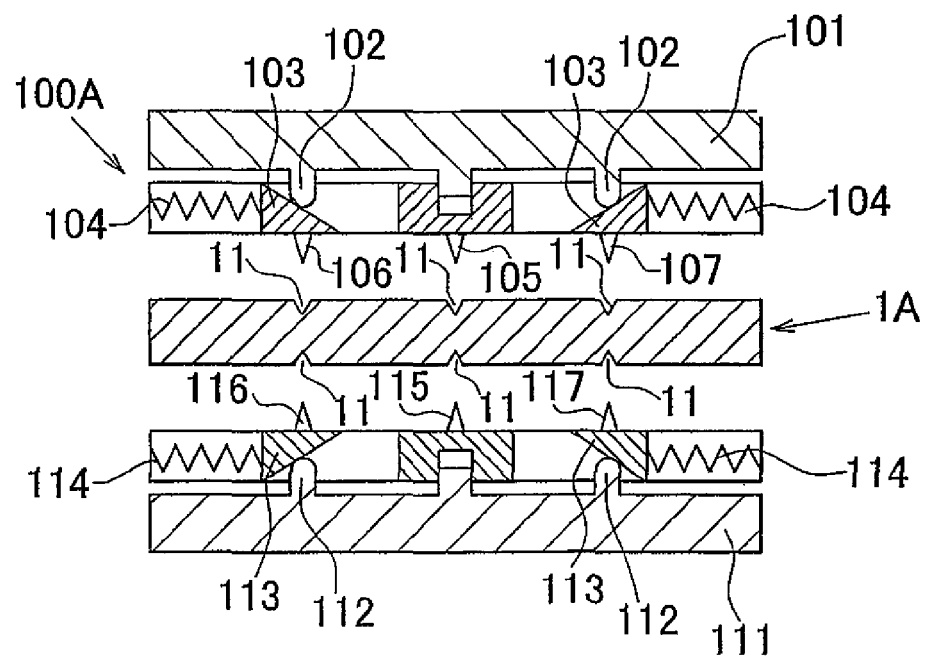
FIGS. 4A and 4B are diagrams illustrating another example embodiment of a method of fracturing a permanent magnet, with FIG. 4A being a diagram showing the permanent magnet positioned inside a fracturing device, and FIG. 4B being a diagram showing the permanent magnet in a fractured state.
Figure 4B:
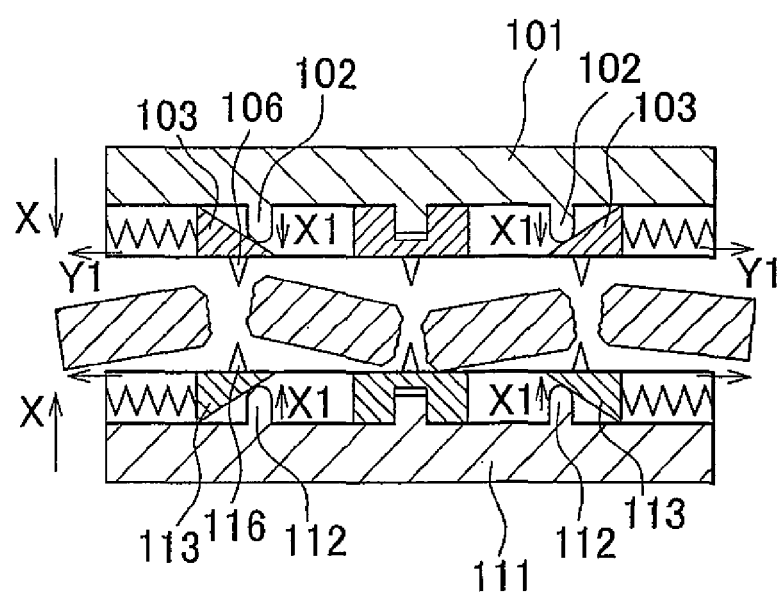
Figure 5:
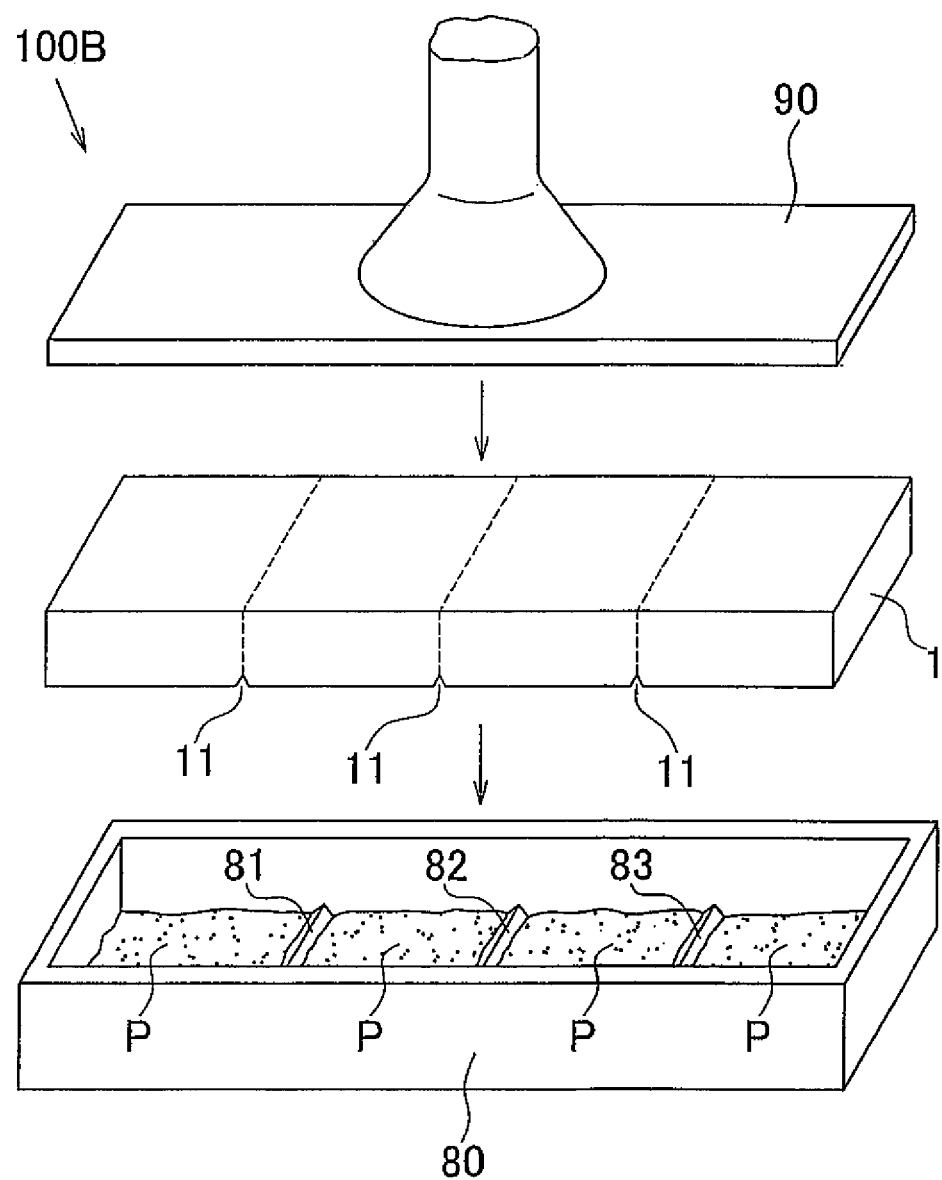
FIG. 5 is a diagram illustrating a method of simultaneously fracturing a permanent magnet and joining the separate pieces.
Figure 6:
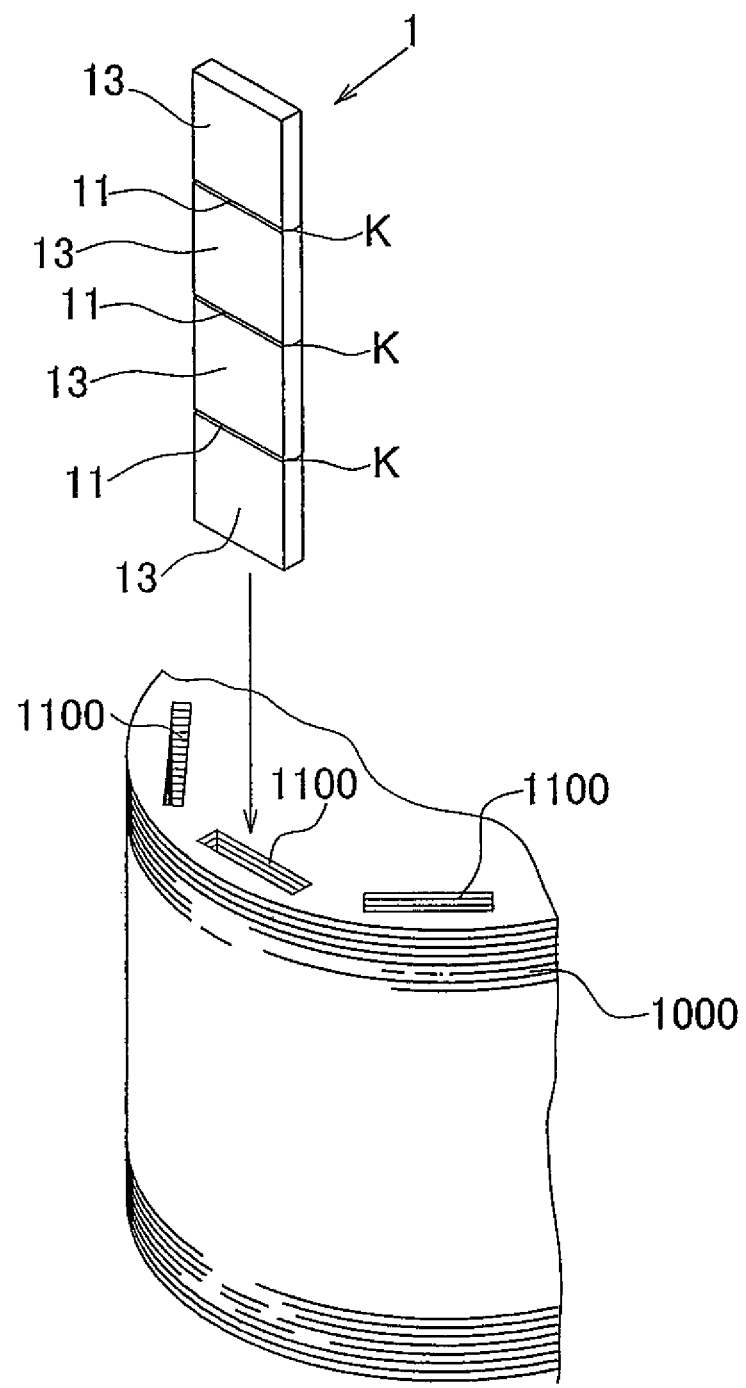
FIG. 6 is a diagram showing a permanent magnet that has been restored being inserted into a rotor slot.

Example embodiments of the present invention will be described in greater detail below with reference to the accompanying drawings. FIGS. 1A and 1B are diagrams illustrating a method of manufacturing a permanent magnet according to the invention, with FIG. 1A being a diagram showing magnetic particles being injected into a forming die, and FIG. 1B being a diagram showing longitudinal magnetic field press forming. FIGS. 2A to 2D are diagrams which follow FIGS. 1A and 1B and illustrate the method of manufacturing a permanent magnet according to the invention, showing, in order from FIG. 2A to FIG. 2D, a permanent magnet that has been extracted from the forming die being fractured in a fracturing device. FIG. 3 is a view showing a fracture line in the structure of the permanent magnet. FIGS. 4A and 4B are diagrams illustrating another example embodiment of a method of fracturing a permanent magnet, with FIG. 4A being a diagram showing the permanent magnet positioned inside a fracturing device, and FIG. 4B being a diagram showing the permanent magnet in a fractured state. FIG. 5 is a diagram illustrating a method of simultaneously fracturing a permanent magnet and joining the separate pieces, and FIG. 6 is a diagram showing a permanent magnet that has been restored being inserted into a rotor slot.

FIGS. 1A and 1B show a forming die for manufacturing a permanent magnet. This forming die basically includes a die 50 that has openings at both the top and bottom, an upper punch 20 and a lower punch 30 that fit into the die 50 through the top and bottom openings, respectively, and slide vertically within the die 50, and coils 40 that are formed around both the upper and lower punches 20 and 30. Incidentally, the forming die in the drawing is a forming die for a longitudinal magnetic field press, in which the direction of the magnetic field generated by the coils is parallel to the sliding direction of the punches. Alternatively, however, a forming die for a lateral magnetic field press, in which coils forming N poles and S poles are arranged on the outside of the die such that a magnetic field is generated that is orthogonal to the punch press direction, may be used.

A cavity C is formed between each end surface of the upper and lower punches 20 and 30. In particular, notch forming protrusions 31 for forming a predetermined number of notches in predetermined locations on one side surface of the permanent magnet which is formed by pressure forming magnetic particles G are provided on the end surface of the lower punch 30. Incidentally, when notches are to be formed in both surfaces of the permanent magnet, a punch may be used in which similar notch forming protrusions are provided in positions on the end surface of the upper punch 20 which correspond to the protrusions 31 on the end surface of the lower punch 30.

As shown in FIG. 1A, the magnetic power G necessary for forming one permanent magnet is injected into the cavity C. Then, as shown in FIG. 1B, longitudinal magnetic field press forming is performed by driving the upper punch 20 down while a magnetic field M is being generated in the direction parallel to the pressing direction (i.e., direction Z in the drawing).

Incidentally, although not shown in the drawings, another press method other than the method described above is a multi-daylight press-forming method, for example. This method uses a forming die that is not provided with notch forming protrusions on either end surface of the upper or lower punches. The amount of injected magnetic particles is divided into thirds, for example, and pressure forming is performed sequentially. With this method, the magnetic particles injected in the first and third injections are of the same material, while the magnetic particles injected in the second injection are of a different material. With each injection, press-forming is performed such that a small pressure-formed body is sequentially formed. The resultant stack of small pressure formed bodies formed by the first, second, and third injections of magnetic particles forms a single press-formed permanent magnet.

When the permanent magnet manufactured by pressure forming as described above is sintered in a sintering furnace in the next step, residual stress caused by differences in thermal expansion of adjacent small pressure formed bodies occurs at the boundary surface between adjacent small pressure formed bodies. Furthermore, the pressed surfaces formed by the multi-daylight press become these boundary surfaces so fracturing occurs easily at these boundary surfaces.

Incidentally, a resin layer that has lower mechanical strength than the small pressure formed bodies, such as a resin layer of polyethylene, polypropylene, or polystyrene or the like, may also be formed between the small pressure formed bodies.

Figure 2A:
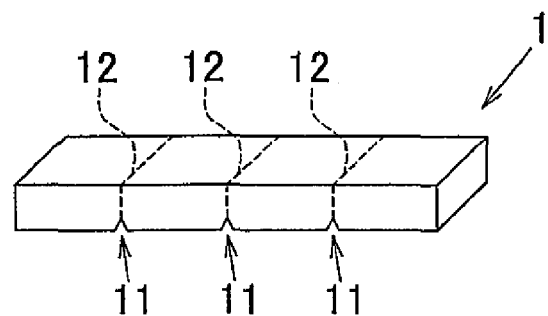
FIGS. 2A to 2D are diagrams which follow FIGS. 1A and 1B and illustrate the method of manufacturing a permanent magnet according to the invention, showing, in order from FIG. 2A to FIG. 2D, a permanent magnet that has been extracted from the forming die being fractured in a fracturing device.

FIG. 2A shows a permanent magnet extracted from a forming die after the longitudinal magnetic field press forming shown in FIG. 1. The permanent magnet 1 shown in FIG. 2A has notches 11 formed in three locations. The permanent magnet 1 is then fractured in three locations aiming at estimated fracture lines 12. Incidentally, as described above, similar notches may also be formed in the upper surface of the permanent magnet 1 in positions corresponding to the notches 11 in the lower surface. Moreover, four or more notches may also be formed as appropriate.

Also, the notch forming method is not limited to the method whereby notches are formed simultaneously in a permanent magnet that has been extracted from a forming die by providing protrusions for forming notches on the inner surface of the cavity of the die as described above. Alternatively, a method whereby notches are formed in those predetermined locations by post-processing after the permanent magnet has been formed may also be employed.

Here, the notches 11 are pickled using hydrochloric acid or sulfuric acid or the like before the permanent magnet 1 is fractured. Oxidizing the notch surface by pickling exposes the grain boundary that forms the main phases located at the surface, which promotes fracturing along the grain boundary surface between main phases.

Pickling in this case refers to oxidizing at least the surface of the notches using hydrochloric acid or sulfuric acid or the like to expose the grain boundary that forms the main phases located at that surface, which promotes fracturing along the grain boundary phase between main phases. Alternatively, pickling turns the grain boundary of the surface into a high-strength oxide such that the strength of the grain boundary phase in between is comparatively lower, thereby leading to the promotion of fracturing along the grain boundary phase.

Figure 2B:
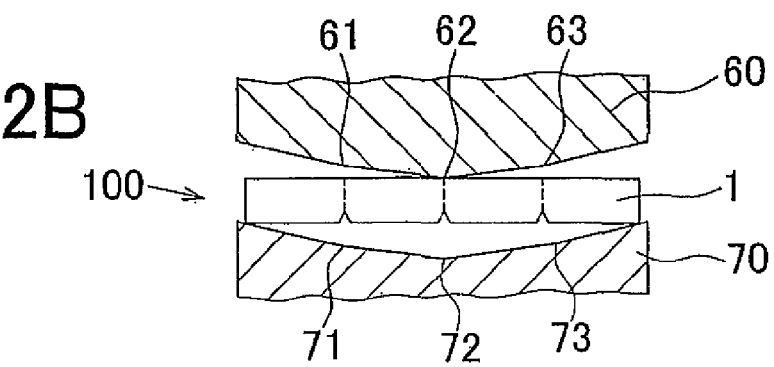

Next, the permanent magnet 1 is positioned between a lower punch 70 and an upper punch 60 which form a fracturing device 100, as shown in FIG. 2B. Here, a convex multi-angular surface, in which break lines 61, 62, and 63 are formed in positions corresponding to the estimated fracture lines, is formed on the end surface of the upper punch 60. Similarly, a concave multi-angular surface, in which break lines 71, 72, and 73 are formed in positions corresponding to the estimated fracture lines and which fits together with the convex multi-angular surface of the upper punch 60, is formed on the end surface of the lower punch 70.

Figure 2C:
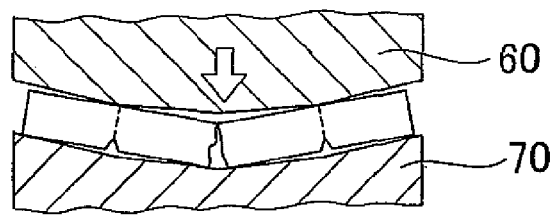
Figure 2D:
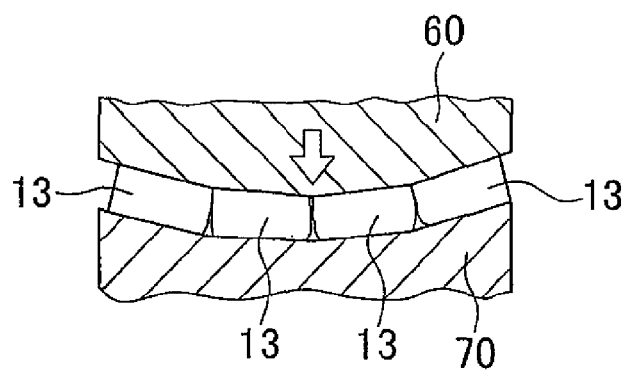

As shown in FIG. 2C, when the upper punch 60 is driven downward, the center of the permanent magnet fractures first, as shown in the drawing. Then when the upper punch 60 is driven down further, the side portions also fracture, as shown in FIG. 2D, such that four separate pieces 13 are obtained.

Figure 9:
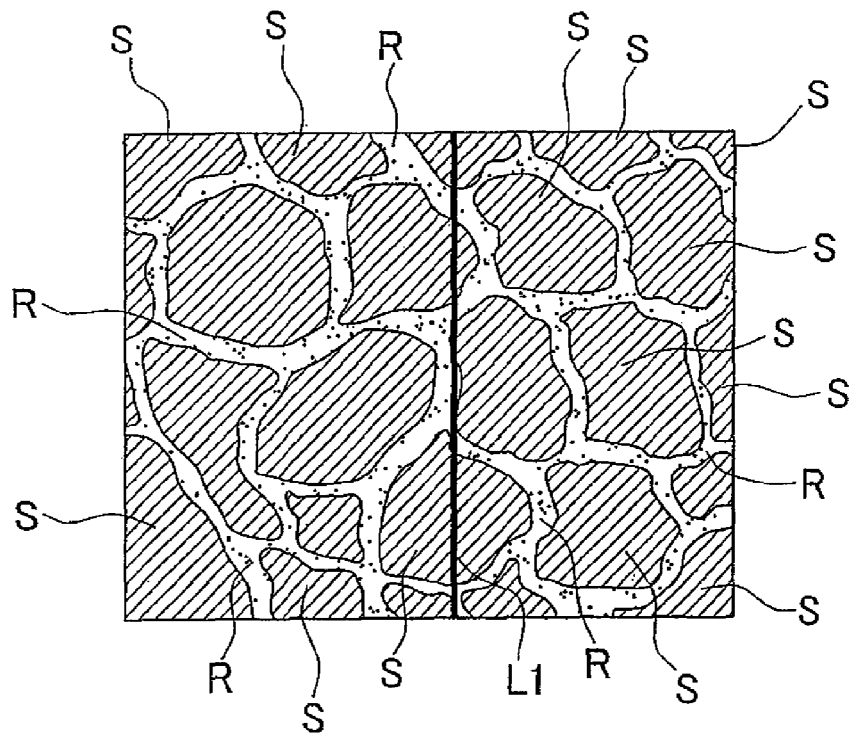
FIG. 9 is a view of a cut line in the structure of a permanent magnet in the case of a machine cut according to related art.

When the permanent magnet is fractured in this way, a fracture line L2 is created as shown in FIG. 3 which is an expanded view of the internal structure of the permanent magnet. Here, the metal structure of the permanent magnet is formed by a grain boundary phase R that contributes to coercive force interposed between main phases S that contribute to magnetism. When this structure is mechanically cut, as it is in the related art, the cut line L1 divides the main phases S as shown in FIG. 9. In contrast, according to this example embodiment, the fracture line L2 is created along the grain boundary phase R which is not as strong as the main phases S. As a result, separate pieces can be obtained while the original sizes of the main phases S are maintained and the outer peripheries of the main phases S are protected by the grain boundary phase R.

FIGS. 4A and 4B are diagrams illustrating another method of fracturing a permanent magnet using a fracturing device according to another example embodiment. Incidentally, in the drawings, a plurality of notches 11 are formed in corresponding positions on both sides of the permanent magnet. A fracturing device 100A is provided with pushing surfaces 101 and 111 farthest to the outside in the vertical direction. Fracturing portions 120 and 130 are provided vertically to the inside of those pushing surfaces 101 and 111. The fracturing portions 120 and 130 include a plurality of sharp pointed members 105, 106, 107, 115, and 117 provided on the surface on the opposite side from the pushing surfaces 101 and 111 in positions corresponding to the notches 11 in the permanent magnet. Furthermore, in the fracturing portions 120 and 130, springs 104 and 114, as well as sliding members 103 and 113 that are connected to these springs 104 and 114, are fixed to the sharp pointed members 106, 107, 116, and 117 other than the sharp pointed members 105 and 115 that correspond to notches in the center, from among the plurality of notches.

These sliding members 103 and 113 have triangular cross-sections when viewed from the side and the sharp pointed members 106, 116, 107, 117 are each fixed to the end surface on the side facing the permanent magnet from among the three sides of the triangular sliding members 103 and 113. Also, the end surface on the pushing side from among the three sides of the triangular sliding members 103 and 113 is slanted with respect to the pushing surface. Protrusions 102 and 112 that protrude from the pushing surfaces 101 and 111 abut against the slanted surface of the sliding members 103 and 113. When the pushing surfaces 101 and 111 are pushed, i.e., driven, down, the protrusions 102 and 112 slide the sliding members 103 and 113 toward the end portion sides of the permanent magnet against the urging force of the springs 104 and 114. As a result, the sharp protruding members 106 and 116 and the like that are fixed to the sliding members 103 and 113, respectively, slide sideways together with the sliding members 103 and 113 while also moving vertically (in the fracturing direction).

When both pushing surfaces 101 and 111 are pushed to the opposite sides (in direction X in FIG. 4B), as shown in FIG. 4B, from the position shown in FIG. 4A, the sliding members 103 and 113 are pushed outward in direction Y1 by the protrusions 102 and 112 pushing the sliding members in direction X1. The corresponding upper and lower sharp pointed members 106 and 116 and the like fracture the permanent magnet 1A, while the separated fragments on the end portions are pushed outward toward the end portion side of the permanent magnet as the corresponding sharp pointed members slide. As a result, the permanent magnet 1A is able to be effectively fractured at the center portion as well.

FIG. 5 is a diagram showing a fracturing device 100B that includes a container 80 with an opening, and a lid 90 that fits into the opening.

The container 80 includes protrusions 81, 82, and 83 in the bottom surface in positions corresponding to the notches 11 formed in the permanent magnet 1. The inner shape and inner dimensions of the container 80 with the lid 90 fitted are generally the same as the inner shape and inner dimensions of the rotor slot into which the permanent magnet 1 is to be inserted.

Resin P for adhering a predetermined amount of separate pieces together is injected into the container 80 before the permanent magnet 1 is placed into the container 80.

The permanent magnet 1 is then placed into the container 80 and the lid 90 is fit onto the container 80 and pushed downward. As a result, in the fracturing device 100B the permanent magnet 1 is fractured into four separate pieces, while at the same time, the resin P penetrates in between the separate pieces. A restored permanent magnet is then obtained once the resin in between the fragments hardens.

Using this fracturing device 100B not only enables the permanent magnet to be fractured and the resultant pieces to be adhered together substantially simultaneously, but also prevents separate pieces from getting lost and alleviates the work of adhering the separate pieces together later.

Incidentally, in order to promote penetration of the resin, the fracturing device may also be provided with a suction device for creating a reduced-pressure atmosphere in the illustrating fracturing device.

Incidentally, the resin may also be injected into the container simultaneously with fracturing. Also, creating a reduced-pressure atmosphere inside the container further increases the penetrating effect of the resin.

The resin described above may be epoxy resin or BMC resin or the like. It is preferable that the resin be heat-resistant to approximately 200° C. for example. Incidentally, BCM resin is molding resin in which strips of glass fiber as a strengthening agent are mixed in with unsaturated polyester resin which is the main component.

As shown in FIG. 6, the permanent magnet 1 that has been fractured (the fracture lines are indicated by the letter K) by the fracturing device 100 or 100B and restored by adhering the pieces back together is inserted into a rotor slot 1100 of an IPM motor rotor 1000 formed of laminated magnetic steel sheets, for example, and fixed in position.

[Comparative Tests and Test Results Relating to Residual Magnetic Flux Density, Coercive Force, and Eddy Loss]

The inventors prepared test pieces of permanent magnet, an IPM motor in which the permanent magnet is fixed in one piece (i.e., unbroken) in the rotor (comparative example 1), an IPM motor in which the permanent magnet has been machine cut with a cutting tool and then restored and fixed in the rotor (comparative example 2), and an IPM motor in which the permanent magnet has been fractured and then restored according to the fracturing method of this example embodiment and fixed in the rotor (the example embodiment), and conducted tests on each. The test pieces each had a cross-section of 6.5 mm×9.9 mm and a length of 57 mm. Also, the permanent magnet that was cut was cut in 14 places such that 15 separate pieces were obtained, and then restored. Similarly, the permanent magnet that was fractured was fractured in 14 places such that 15 separate pieces were obtained, and then restored.

Using the test pieces described above, the coercive force (Hcj) and the residual magnetic flux density (Br) which are magnetic properties of the comparative examples 1 and 2 and the example embodiment were measured and the test results compared. Furthermore, to prove that the permanent magnet that was fractured is equivalent in terms of eddy loss to the permanent magnet that was machine cut according to the related art, the eddy loss in the comparative example 2 and the example embodiment was measured and the test results compared.

Figure 7A:
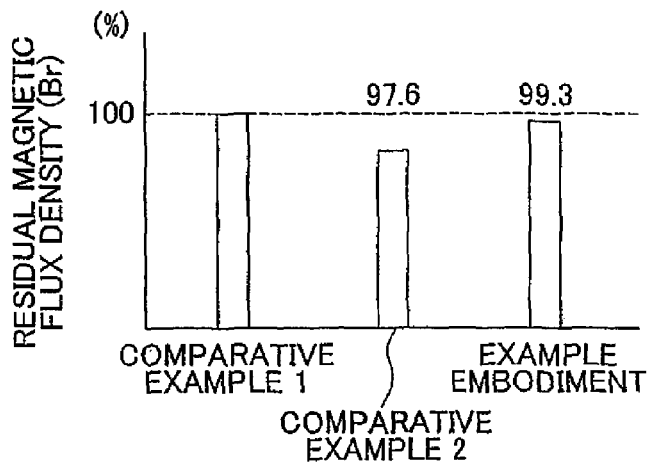
FIGS. 7A to 7C are charts relating to an IPM motor provided with an undivided permanent magnet (comparative example 1), an IPM motor provided with a machine cut permanent magnet (comparative example 2), and an IPM motor provided with a permanent magnet fractured according to the manufacturing method of the invention, with FIG. 7A being a chart comparing the measured results relating to the residual magnetic flux density of each, FIG. 7B being a chart comparing the measured results relating to the coercive force of each, and FIG. 7C being a chart comparing the measured results relating to the eddy loss in comparative example 2 and the example embodiment.
Figure 7B:
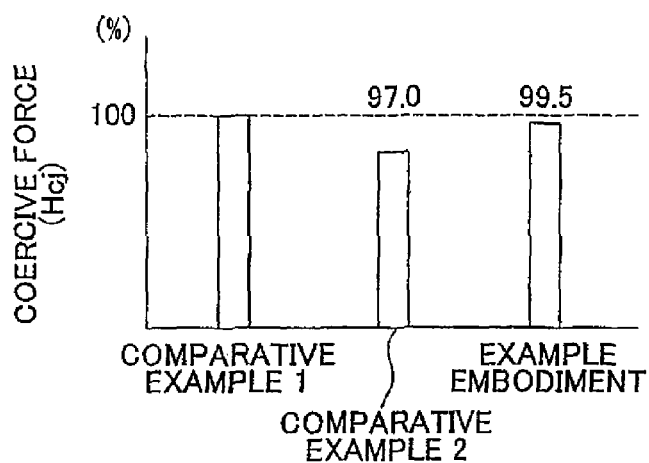
Figure 7C:
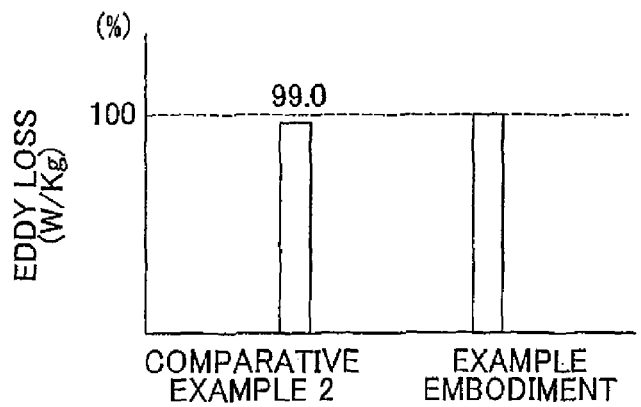

The comparative results are shown in FIGS. 7A to 7C. Incidentally, in FIGS. 7A and 7B, the measured value of comparative example 1 is 100 and the measured values of the other test pieces are indicated by percentage with respect to this. Also, in FIG. 7C, the measured value of the example embodiment is also 100.

According to FIG. 7A, it is evident that the value of comparative example 2 in which the permanent magnet was cut is 97.6 and the value of the example embodiment in which the permanent magnet was fractured is 99.3, which is 1.7 points above the value of comparative example 2. This increased value for residual magnetic flux density is extremely large in terms of the magnetic properties of a motor, and is due to the fact that the main phases that form the permanent magnet were not divided and reduced in size, as described above.

Also, according to FIG. 7B, it is evident that the value of comparative example 2 is 97.0 and the value of the example embodiment is 99.5, which is 2.5 points above the value of comparative example 2. Similar to the residual magnetic flux density, this increased value for the coercive force is also extremely large in terms of the magnetic properties of a motor, and is also due to the fact that magnetic reversal did not occur because the covering of the grain boundary phase that surrounds the main phases did not break as a result of the fracturing, as described above.

Further, according to FIG. 7C, it is evident that the eddy loss of the example embodiment is approximately the same as that of comparative example 2. It is therefore evident that even if the permanent magnet is fractured, eddy loss equivalent to that when the permanent magnet is machine cut can be expected.

[Test and Test Results Relating to Fracture Speed and Grain Boundary Fracture Area]

In addition, the inventors also prepared test pieces in which a single notch was formed in the center of a permanent magnet. This permanent magnet was then supported at two points on the left and right lower ends so as to straddle the notch, and approximately the same pressure load was applied at a constant pressing speed (fracture speed) to the left and right of the notch, after which the percentage of grain boundary sectional area of the fracture surface was measured. This test was performed at various fracture speeds. The measurement results of the grain boundary sectional area at each fracture speed are shown in FIG. 8.

Figure 8:
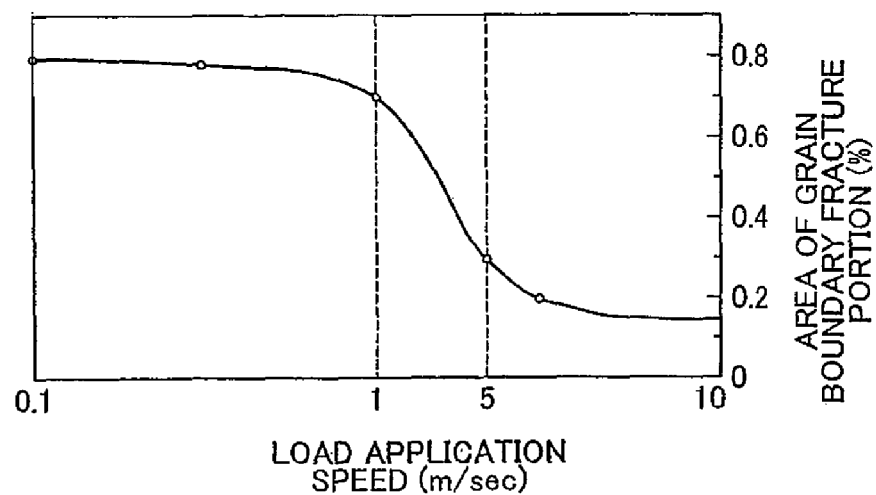
FIG. 8 is a graph showing the test results regarding the relationship between fracture speed and grain boundary fracture area.

According to FIG. 8, it is evident that a fraction speed of approximately 5 m/sec is the inflexion point, with the grain boundary fracture area at that time being approximately 30% of the entire fracture area. A fracture speed slower than this results in a sudden increase in grain boundary fracture area, with a fracture speed of approximately 1 m/sec resulting in the grain boundary fracture area being approximately 70% of the entire fracture area and a fracture speed of approximately 0.1 m/sec resulting in the grain boundary fracture area being approximately 80% of the entire fracture area. According to these test results, it is preferable that fracturing be performed at a fracture speed of 5 m/sec or less, and more preferably, 1 m/sec or less.

Although example embodiments of the invention have been described in detail with reference to the drawings, the specific structure is not limited to these example embodiments. That is, many modifications and variations, such as design changes, are also included within the intended scope of the invention.

For example, the permanent magnet that is obtained by the manufacturing method according to the example embodiment of the invention is not particularly limited as long as it includes a rare-earth magnet, a ferrite magnet, or an alnico magnet or the like, and has a metal structure made up of main phases that contribute to magnetism and a grain boundary phase that contributes to coercive force. Also, the term permanent magnet in this invention may also refer to a sintered body or simply a compact body that has not yet been magnetized, as well as the rare-earth magnet or the like that has been magnetized. Examples of rare-earth magnets include a neodymium magnet with a three-component system in which iron and boron have been added to neodymium, a samarium-cobalt magnet made of a two-component system alloy of samarium and cobalt, a samarium-iron-nitrogen magnet, a praseodymium magnet, and the like. Among these, a rare-earth magnet has a higher maximum energy product (BH) max than a ferrite magnet or an alnico magnet does so a rare-earth magnet is more suitable for application in a driving motor of a hybrid vehicle or the like where high output is required.

Further, in the manufacturing method according to the example embodiment of the invention, a forming die that includes a punch and a die and the like having a predetermined cavity may be prepared, magnetic particles for a permanent magnet injected into this forming die, and pressure forming performed at a normal temperature atmosphere (step 1). Incidentally, this pressure forming may be magnetic forming in a longitudinal magnetic field or a lateral magnetic field, for example. This pressure forming forms a permanent magnet having the same or similar shape and size as the inside of the rotor slot, for example. That is, generally the same shape and size in this example embodiment includes not only the same shape and size, but also a similar shape and size. However, in this example embodiment of the invention, the permanent magnet, which has been fractured into separate pieces and those separate pieces then put back together (i.e., integrated) with molding resin or the like, is inserted and fixed in the rotor slot so the dimensions of the permanent magnet are slightly smaller than the dimensions of the rotor slot.

In the method of fracturing and then restoring the permanent magnet, it is preferable in terms of manufacturing efficiency to perform the required number of fractures all at once. For example, when three or more notches are formed in a single permanent magnet such that four or more separate pieces will be formed, the inventors have determined that the permanent magnet fractures easily at the end portions but not easily near the center. Therefore, when attempting to form the separate pieces all at once, all of the separate pieces can theoretically be obtained by, for example, inserting the sharp pointed members into the notches and pushing them down simultaneously. In actuality, however, inserting the sharp pointed members into the notches at the end portions generates compression force from both ends of the permanent magnet toward the center. As a result, the member strength of the permanent magnet from the compression force from the left and right is greater than the insertion force of the sharp pointed member at the center portion, which makes it more difficult to fracture the permanent magnet at the center portion.

Therefore, in this example embodiment, a fracturing device is used which has a plurality of sharp pointed members that correspond to a plurality of notches provided on a common pushing surface, and pushing members such as springs provided on the sharp pointed members other than the sharp pointed member that corresponds to the notch in the center. Pushing the pushing surface down presses the sharp pointed members into the corresponding notches, fracturing the permanent magnet. At the same time, the pushing members push the resultant separated pieces out toward the end portions of the permanent magnet, which suppresses compression force from being generated toward the center of the permanent magnet, thus enabling the portion near the center to be fractured. Incidentally, the sharp pointed members on the end portions of the permanent magnet may be made longer (i.e., taller) than those in the center, such that when the pushing surface is pushed down in a single stroke, the end portions fracture first and the resultant separate pieces are pushed to the outside, after which the center then fractures.

Incidentally, the permanent magnet manufactured according to the manufacturing method of the example embodiment of the invention described above, a rotor provided with this permanent magnet, and an IPM motor provided with this rotor are particularly well suited to a driving motor of a hybrid vehicle or an electric vehicle in which high output performance is desired.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

The invention claimed is:

1. A manufacturing method of a permanent magnet that is to be inserted into a slot of a rotor for an IPM motor, comprising:
producing a permanent magnet of generally the same shape and size as the shape and size of the inside of the slot by pressure forming magnetic particles for the permanent magnet in a forming die;
forming a small number of separate pieces by fracturing the permanent magnet; and
restoring the permanent magnet by fitting fracture surfaces of adjacent separate pieces together,
wherein the small number is predetermined and is bigger than 1.

2. The manufacturing method according to claim 1, wherein forming the small number of separate pieces includes pressing on a predetermined portion of the pressure formed permanent magnet.

3. The manufacturing method according to claim 2, further comprising:
forming a notch in the permanent magnet before fracturing the permanent magnet, wherein the predetermined portion is the notch.

4. The manufacturing method according to claim 1, wherein a notch is formed in the permanent magnet when the permanent magnet is pressure formed.

5. The manufacturing method according to claim 4, wherein the permanent magnet is fractured after the notch is pickled.

6. The manufacturing method according to claim 1, wherein a notch is formed in the permanent magnet before fracturing the permanent magnet.

7. The manufacturing method according to claim 6, wherein the permanent magnet is fractured after the notch is pickled.

8. The manufacturing method according to claim 1, wherein the permanent magnet is formed with a plurality of small pressure formed bodies stacked sequentially by performing the pressure forming sequentially in multiple stages; and at least the small pressure formed bodies that are adjacent to one another are formed from magnetic particles of different material.

9. The manufacturing method according to claim 8, wherein residual stress occurs between the plurality of small pressure formed bodies.

10. The manufacturing method according to claim 8, wherein the pressure formed permanent magnet is fractured between the plurality of small pressure formed bodies.

11. The manufacturing method according to claim 1, wherein fracturing the permanent magnet is done in a container filled with resin; and restoring the permanent magnet includes adhering the small number of separate pieces together with the resin.

12. The manufacturing method according to claim 1, wherein fracturing the permanent magnet is done in a container filled with resin; and restoring the permanent magnet includes molding the small number of separate pieces together with the resin.

13. The manufacturing method according to claim 1, wherein fracturing the permanent magnet is done in a container; resin is injected into the container at the same time the permanent magnet is fractured; and restoring the permanent magnet includes adhering the small number of separate pieces together with the resin.

14. The manufacturing method according to claim 1, wherein fracturing the permanent magnet is done in a container; resin is injected into the container at the same time the permanent magnet is fractured; and restoring the permanent magnet includes molding the small number of separate pieces together with the resin.

15. The manufacturing method according to claim 1, wherein fracturing the permanent magnet is done at a fracture speed of 5 meters per second or less.

16. The manufacturing method according to claim 1, wherein when the pressure formed permanent magnet is to be fractured into at least four separate pieces and at least three notches are formed in the permanent magnet, a fracturing device is used which includes a plurality of sharp pointed members that fit into corresponding notches and pushing members that push the sharp pointed members other than the sharp pointed member in the center out toward the end portions of the permanent magnet, and the permanent magnet is fractured while the pushing members push the corresponding sharp pointed members out when the sharp pointed members are pushed into the notches during fracturing.

17. The manufacturing method according to claim 1, wherein the permanent magnet is formed of multiple main phases and a grain boundary phase interposed between the main phases; and fracturing of the permanent magnet is performed along the grain boundary phase.

18. The manufacturing method according to claim 1, wherein the permanent magnet is a rare-earth magnet.

19. The manufacturing method according to claim 1, wherein the predetermined number of separate pieces is four.

20. A permanent magnet manufactured by the manufacturing method according to claim 1.

21. A rotor for an IPM motor in which the permanent magnet according to claim 20 is provided in the slot.

22. An IPM motor provided with at least the rotor according to claim 21.

23. The manufacturing method according to claim 1, wherein the permanent magnet is restored to the same shape and same size as the shape and the size of the inside of the slot by fitting the fracture surfaces of the adjacent separate pieces together.

* * * * *